UNITED STATES PATENT OFFICE.

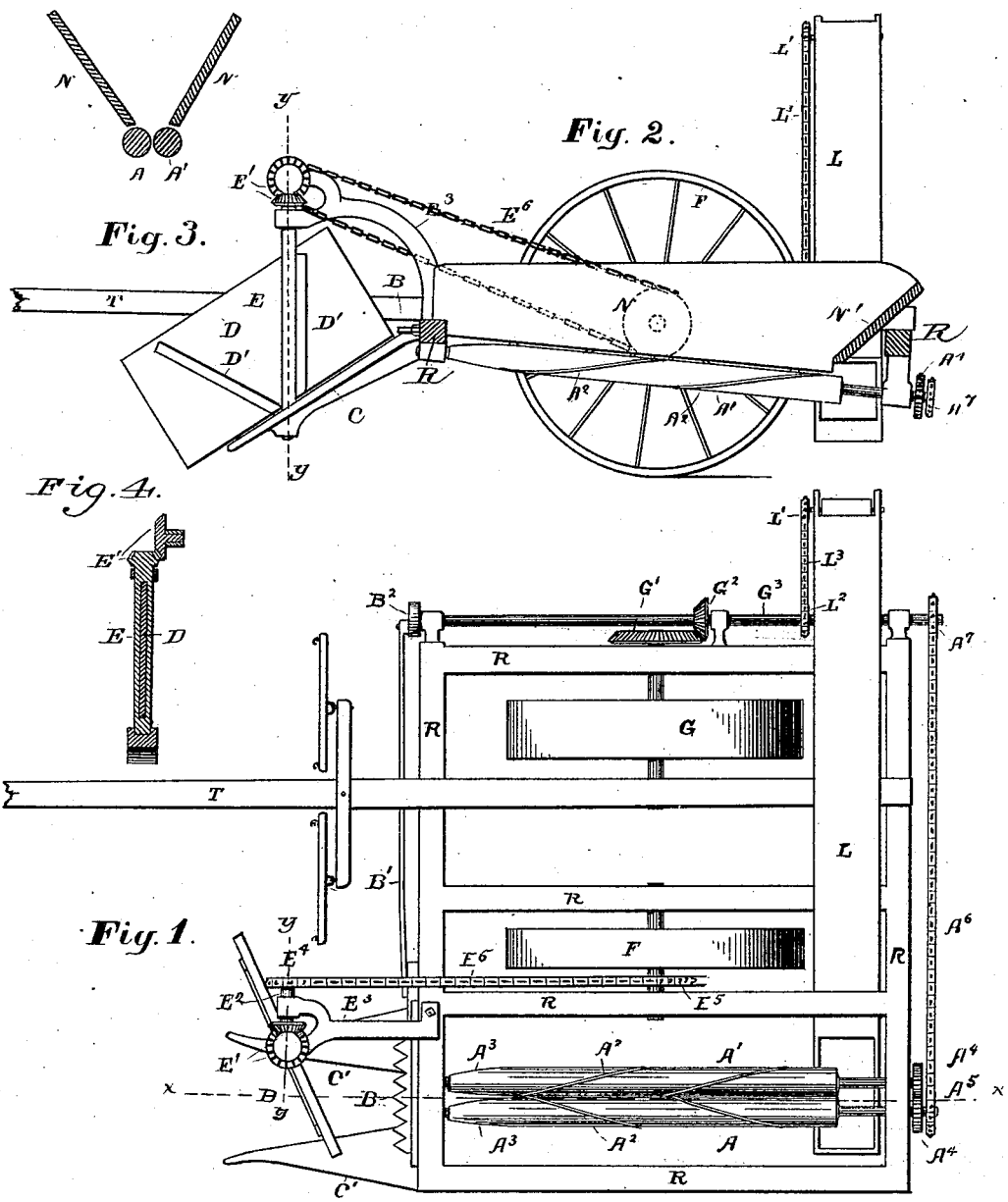

EDMUND W. QUINCY, OF PEORIA, ILLINOIS.

CORN HARVESTER AND HUSKER.

SPECIFICATION forming part of Letters Patent No. 308,094, dated November 18, 1884.

Application filed October 31, 1883. (No model.)

*To all whom it may concern:*

Be it known that I, EDMUND W. QUINCY, of the city of Peoria, in the county of Peoria, in the State of Illinois, have invented an Improved Corn Harvester and Husker; and I do hereby declare that the following is a full, clear, and exact description thereof, reference being had to the annexed drawings, making a part of this specification, in which like letters of reference refer to like parts, and in which—

Figure 1 represents a plan view of the machine; Fig. 2, a vertical section through the line $x\ x$ in Fig. 1; Fig. 3, a cross-section of the husking-rollers and inclined boards, and Fig. 4 a vertical section of the gathering-boards and the shaft on the line $y\ y$ in Figs. 1 and 2.

The work which this machine is designed to perform is to sever the stalks of standing corn as the machine advances to throw the cut stalks backward upon two rollers, by which the ears of corn are separated from their husks, and to elevate the husked ears to some receptacle traversing the field beside the machine.

In the drawings, R R R R represent the frame-work; T, the tongue; F and G, the supporting and drive wheels; A A', the husking-rollers; B, the sickle, and L the elevator. The rollers A A', having coupled gears $A^4$, are driven by power communicated from the shaft $G^3$ through the sprocket-wheels $A^5$ and $A^7$ and chain-belt $A^6$. Said shaft $G^3$ is driven by the drive-wheel G, suitable gearing connecting the same. In front of these rollers the sickle B is reciprocated by a rod, B', connecting with a crank-disk, $B^2$, at the end of the shaft $G^3$. Near the ends of said sickle B project forward and downward the tapering arms C C', the front ends of which are but a slight distance above the level of the ground. From the arm C' a shaft, E, extends vertically upward to bearings in a bracket, $E^3$. Bevel-gears E', a short shaft, $E^2$, sprocket-wheel $E^4$, and a chain, $E^6$, connecting the latter to a sprocket-wheel on the axle of the drive-wheel F, serve to rotate said shaft E. Longitudinally through this shaft E is a slot, in which fits loosely the plate D. The obliquely-arranged slats D' D', fastened to the plate D, permit and control a longitudinal rocking motion of said plate about the center of its lower edge. As shown in Fig. 2, the lower edge of the plate D will rest upon the upper side of the arm C', and will, when in this position of revolution, let one corner nearly touch the ground. At right angles from this position the lower edge of the plate will be parallel to the ground and sweep over both arms C C'; but as it completes another quarter of revolution the previously upper corner of the plate D now becomes the lower. The object of this motion of the plate D is to lift up the down corn, and to sweep both it and the upright stalks of corn in between the arms C C' and to the sickle B. It is to aid also in throwing the severed cornstalks backward upon the rollers A A'.

The rollers A A' are, as shown in Fig. 2, not perfectly horizontal, but are considerably lower at their rear ends than in front. The object of this is that the naked ears of corn may be impelled along upon them to their rear ends, at which they will drop through to the elevator L, and be carried up and over to the receptacle provided therefor. To aid in this movement of the ears after their husks and stalks have been stripped therefrom and dropped to the ground, I have placed about the rollers A A' several spiral projections, $A^2$, as shown. These long-drawn-out spiral threads act, as their rollers revolve, to push along the ears of corn. This push, taken in connection with the inclination of the rollers and the jarring of the machine, serves to impel the corn to the rear ends of the rollers A A'. The front ends of the rollers are tapered somewhat to permit the easier escape between them of the butt portion of the stalks.

To bring the cornstalks directly down between the rollers as they are thrown over backward by the gatherer D, I furnish the inclined boards N N, whose lower edges are just above the rollers, but whose upper edges spread some distance apart. A rear board, N', prevents the stalks from getting entangled with the gears $A^4$.

Fig. 3 represents the way in which the said boards N N are arranged with respect to the rollers A A'.

The elevator L consists simply of a spout in which is longitudinally propelled an endless apron on which are suitable cleats for holding the ears of corn thereon. The sprocket-wheel $L^2$ of the shaft $G^3$, chain $L^3$, sprocket-wheel $L'$, and roller connected therewith serve to communicate the required motion to said apron.

The proportional size of my machine is such that the rollers A A' are nearly equal in length to ordinary cornstalks, and from the tongue to the center of the sickle B is equal to the distance between two rows of corn.

Although I have described one set of rollers, I do not restrict myself to such number, but design using several sets of rollers arranged side by side.

When in use in the field, the gatherer D raises up the down corn and sweeps it and the upright corn back against the sickle B, by which the same is severed. The throw of said gatherer D, aided by the forward movement of the machine, causes the cut corn to fall over between the inclined boards N N and upon the rollers A A'. By these rollers the stalks and husks are separated from the ears, being drawn through between said rollers and dropped to the ground, while the naked ears are propelled along upon the rollers to their lower ends, at which the said ears drop through to the elevator L. By this elevator the ears of corn are carried up and deposited into the wagon beside the harvester.

What I claim as my invention, and for which I desire Letters Patent, is as follows, to wit:

1. In a corn harvester and husker, two or more approximately horizontal rollers having their axes in the line of advance of the machine, in combination with a sickle in front of the ends of said rollers.

2. In a corn harvester and husker, two or more approximately horizontal rollers having their axes in the line of advance of the machine, in combination with a sickle in front of the ends of said rollers, and means whereby the husked ears of corn may be conveyed away.

3. In a corn harvester and husker, the combination of the approximately horizontal rollers, the projecting arms C C', a vertical shaft having bearings for its lower end in one of said arms, means for rotating said shaft, and a plate connected to said shaft in such a manner as to rotate therewith, and at the same time rock in its own plane about the center of its lower edge, as and for the purpose specified.

4. In a corn harvester and husker, the slotted vertical shaft E, and means for rotating it, in combination with the plate D, having obliquely-arranged strips D', substantially as and for the purpose set forth.

5. In combination with suitable frame-work, the arms C C', the gatherer D, mechanism for rotating said gatherer, the sickle B, means for reciprocating said sickle, the rollers A A', and means for driving said rollers, as set forth.

In testimony that I claim the foregoing invention I have hereunto set my hand this 29th day of October, 1883.

EDMUND W. QUINCY.

Witnesses:
   ALBERT G. WEBBER,
   GEO. LOWER.